US006995204B2

United States Patent
Endou et al.

(10) Patent No.: US 6,995,204 B2
(45) Date of Patent: Feb. 7, 2006

(54) THERMOPLASTIC RESIN COMPOSITION

(75) Inventors: Hideki Endou, Tokyo (JP); Hideki Nakagawa, Tokyo (JP)

(73) Assignees: Asahi Glass Company, Limited, Tokyo (JP); Asahi Fiber Glass Company, Limited, Tokyo (JP)

( * ) Notice: Subject to any disclaimer, the term of this patent is extended or adjusted under 35 U.S.C. 154(b) by 76 days.

(21) Appl. No.: 10/722,525

(22) Filed: Nov. 28, 2003

(65) Prior Publication Data

US 2004/0167294 A1    Aug. 26, 2004

(30) Foreign Application Priority Data

Feb. 3, 2003    (JP) ............................ 2003-026053
Nov. 17, 2003    (JP) ............................ 2003-386156

(51) Int. Cl.
    *C08K 3/32*    (2006.01)
(52) U.S. Cl. ....................... 524/417; 524/430
(58) Field of Classification Search ............... 524/417, 524/430
    See application file for complete search history.

(56) References Cited

U.S. PATENT DOCUMENTS

| 3,933,689 A | 1/1976 | Ray et al. |
| 4,544,695 A | 10/1985 | Myers |
| 6,454,969 B1 | 9/2002 | Nishihara |
| 2002/0115759 A1 | 8/2002 | Eckel et al. |

FOREIGN PATENT DOCUMENTS

| EP | 0 643 097 | 3/1995 |
| EP | 0 643 097 A1 * | 3/1995 |
| JP | 9-3335 | 1/1997 |
| JP | 10-101364 | 1/1998 |
| JP | 2000-226502 | 8/2000 |
| JP | 2001-64036 | 3/2001 |
| JP | 2001-64524 | 3/2001 |
| JP | 2001-234168 | 8/2001 |

OTHER PUBLICATIONS

Patent Abstracts of Japan, JP 59-219367, Dec. 10, 1984.
U.S. Appl. No. 10/722,525, filed Nov. 28, 2003, Endou et al.
U.S. Appl. No. 10/899,092, filed Jul. 27, 2004, Nakagama et al.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

A thermoplastic resin composition comprising a thermoplastic resin containing no halogen atom, from 0.1 to 50 parts by mass, per 100 parts by mass of said thermoplastic resin, of a phosphate type glass, and from 0.1 to 50 parts by mass, per 100 parts by mass of said thermoplastic resin, of a phosphorus type flame retardant other than the above phosphate type glass.

37 Claims, No Drawings

THERMOPLASTIC RESIN COMPOSITION

The present invention relates to a thermoplastic resin composition. Particularly, it relates to a thermoplastic resin composition excellent in flame retardancy and having the recycling property improved.

A thermoplastic resin composition is excellent in moldability and is thus widely used as a material to obtain molded products of various shapes. However, many of thermoplastic resins are usually readily flammable and poor in flame retardancy, whereby the application range of molded products is substantially limited. Therefore, various flame retardants have been developed to improve the flame retardancy of thermoplastic resin compositions. Usually, a metal hydroxide utilizing the heat-absorbing effect during dehydration, such as aluminum hydroxide, magnesium hydroxide; a compound containing halogen atoms such as bromine atoms or chlorine atoms, represented by decabromodiphenyl ether or chlorinated paraffin; and a metal oxide particularly effective in suppressing smoke generation during combustion, such as molybdenum oxide, have been used. Further, it is also known that a phosphorus type compound represented by a phosphoric acid ester, ammonium polyphosphate or red phosphorus, shows flame retardancy. It is said that the phosphorus type compound is converted to a polyphosphoric acid at the time of combustion to cover the combustion surface or has a function to carbonize the resin by a dehydration action.

From a viewpoint of environmental problems, there is a trend to avoid use of a resin containing chlorine atoms or bromine atoms or a resin having incorporated therein a halogen type flame retardant containing chlorine atoms or bromine atoms. Accordingly, a phosphorus type compound has attracted an attention as a flame retardant containing no halogen. However, a phosphorus type compound is decomposed in a range of from about 350 to 450° C. and thus has had a problem that in many cases, it is poor in the flame retardancy in a temperature range of at least 450° C. Further, a resin composition having a liquid phosphorus type compound incorporated, has had a problem that the heat resistance tends to be inadequate in many cases.

Further, a low melting point glass is expected to have a function as a flame retardant, since it has a function such that when heated, it forms a viterous coating film on the surface of a molded product to shield oxygen. U.S. Pat. No. 4,544,695 discloses that a low melting point glass comprising a sulfate is effective, but such glass has a problem in water resistance and is not practically used. Whereas, JP-A-09-003335 and JP-A-10-101364 disclose that a phosphate type glass containing a sulfate is highly effective in controlling smoke generation during combustion of a vinyl chloride type resin. However, this phosphate type glass is a low melting point glass primarily intended to suppress smoke generation, and its effect is not known against a resin containing no chlorine and not primarily intended to control smoke generation. Further, JP-A-2001-64036 and JP-A-2001-64524 disclose a phosphate type glass which shows high flame retardancy for a thermoplastic resin while maintaining practical water resistance. However, among such phosphate type glasses, there is a glass having a glass transition temperature exceeding 400° C. or a glass having a glass transition temperature lower than 300° C. Therefore, there has been a case where it is difficult to impart sufficient flame retardancy to a resin which undergoes decomposition in a temperature range of from about 300 to 400° C.

Further, from the viewpoint of environmental problems and resource saving, a molded product obtained by molding a resin composition is desired to have a recycling property. Namely, a resin composition is desired whereby, even when a waste molded product is repeatedly used by melting and kneading it again to obtain a molded product, deterioration in the physical properties or flame retardancy of the molded product is minimum (JP-A-2000-226502). However, there has been a problem that when a molded product obtained by molding a resin composition having a phosphorus-type flame retardant incorporated, is recycled, the number of times for use by recycling is limited due to deterioration of the flame retardancy. Further, JP-A-2001-234168 discloses a resin composition having a low melting point glass incorporated as a flame retardant, but no consideration is given to its recycling property.

It is an object of the present invention to solve the above-mentioned problems relating to the specific thermoplastic resin and to provide a thermoplastic resin composition whereby it is possible to obtain a molded product excellent in the flame retardancy and having its recycling property improved.

The present inventors have conducted an extensive study to solve the above problems and as a result, have found a thermoplastic resin composition having flame retardancy. Namely, the present invention provides the following thermoplastic resin composition.

A thermoplastic resin composition comprising a thermoplastic resin containing no halogen atom, from 0.1 to 50 parts by mass, per 100 parts by mass of said thermoplastic resin, of a phosphate type glass, and from 0.1 to 50 parts by mass, per 100 parts by mass of said thermoplastic resin, of a phosphorus type flame retardant other than the above phosphate type glass.

The present invention further provides such a thermoplastic resin composition wherein the thermoplastic resin containing no halogen atom is at least one thermoplastic resin selected from the group consisting of a polycarbonate resin, a polyphenylene ether resin, a polystyrene resin and an acrylonitrile/butadiene/styrene copolymer resin.

Further, the present invention provides such a thermoplastic resin composition which further contains a antidripping agent in an amount of from 0.05 to 2 parts by mass per 100 parts by mass of the thermoplastic resin containing no halogen atom.

Further, the present invention provides such a thermoplastic resin composition wherein the phosphorus type flame retardant other than the phosphate type glass is at least one member selected from the group consisting of a monomer type phosphoric acid ester flame retardant and a condensed type phosphoric acid ester flame retardant.

Further, the present invention provides such a thermoplastic resin composition wherein the phosphate type glass has a glass transition temperature higher than 300° C. and lower than 400° C.

Further, the present invention provides such a thermoplastic resin composition wherein the phosphate type glass is a phosphate type glass having surface treatment preliminarily applied.

From the above thermoplastic resin composition of the present invention, it is possible to obtain a molded product excellent in flame retardancy. Further, it is possible to obtain a molded product whereby the flame retardancy will not decrease even when melt-kneading is repeated and thus the recycling property is improved. By the combination of the phosphate type glass and the phosphorus type flame retardant, the flame retardancy of the thermoplastic resin composition is improved as compared with a case where they are used independently. Further, by the combination of the phosphate type glass and the phosphorus type flame retardant, deterioration in the heat resistance of the resin composition can be suppressed as compared with a case where the phosphorus flame retardant is used alone.

Description of the Thermoplastic Resin

In the present invention, the thermoplastic resin containing no halogen atom is a thermoplastic resin which does not substantially have halogen atoms such as chlorine atoms or bromine atoms in its polymer structure. As such a thermoplastic resin, a so-called engineering resin having high heat resistance, is preferred. Such an engineering plastic is a resin which is used especially for electric components and for which the flame retardancy is highly required. Such a resin is highly flammable and is a resin whereby if a flame retardant is incorporated in a large amount, the characteristics of the resin such as the mechanical properties tend to be hardly obtainable, and the effects for the flame retardancy by the present invention can distinctly be observed.

In the present invention, the thermoplastic resin containing no halogen atom is preferably at least one thermoplastic resin selected from the group consisting of a polycarbonate resin, a polyphenylene ether resin, a polystyrene resin, an acrylonitrile/butadiene/styrene copolymer resin, an aromatic polyester resin, a polyamide resin, a polyarylate resin, a polyphenylene sulfide resin, a polysulfone resin, a polyethersulfone resin, a polyether ether ketone resin and a polyether imide resin. Particularly preferably, the thermoplastic resin containing no halogen atom is at least one thermoplastic resin selected from the group consisting of a polycarbonate resin, a polyphenylene ether resin, a polystyrene resin and an acrylonitrile/butadiene/styrene copolymer resin.

The thermoplastic resin preferred in the present invention may be a mixture of such resins. For example, it may be a mixture of a polyphenylene ether resin and a polystyrene resin. Further, such a thermoplastic resin may contain other monomer units in its polymer structure in an amount smaller than the main monomer units. For example, the polystyrene resin may be a polystyrene resin having butadiene units. Further, such a thermoplastic resin may be a mixture with another thermoplastic resin in an amount smaller than the main resin. The proportion of such other monomer units or another resin is usually less than 50 mass %, preferably at most 30 mass %, based on the total amount of thermoplastic resins.

As another thermoplastic resin which can be used as mixed to the preferred thermoplastic resin in the present invention, a thermoplastic resin containing no halogen atom is preferred. Such another thermoplastic resin may, for example, be a polyolefin resin represented by e.g. a polyethylene resin or a polypropylene resin, a polymethyl methacrylate resin, a polyvinyl acetate resin, a polyethylene oxide resin, a polyvinyl ether resin, a polyvinyl alcohol resin or a thermoplastic urethane resin. For example, the preferred thermoplastic resin in the present invention may be a mixture of a polyphenylene ether resin with a polyolefin resin or a polyamide resin.

In the present invention, the form of the thermoplastic resin containing no halogen atom (hereinafter referred to simply as the thermoplastic resin) is not particularly limited, and various forms such as a pellet form, a granular form, a powder form and a fiber form, may be employed. Further, the above thermoplastic resin may contain a thermoplastic resin composition obtainable by recycling a molded product obtained by molding the thermoplastic resin composition.

Description of the Phosphate Type Glass

The phosphate type glass in the present invention is a phosphate type glass having a relatively low melting point which is capable of functioning as a flame retardant for a resin, and its glass transition temperature is preferably higher than 200° C. and lower than 500° C. Particularly preferred is a phosphate type glass having a glass transition temperature higher than 300° C. and lower than 400° C. If the glass transition temperature is too low, the glass is likely to be melted by the heat at the time of combustion of the resin component of the thermoplastic resin composition, whereby although there may be a flame retarding effect at a low temperature, in a high temperature range, the glass is likely to flow as the viscosity becomes low, and a coating film of the glass tends to be hardly formed. Consequently, the flame retardancy or the effect for suppressing smoke generation tends to be poor. On the other hand, if the glass transition temperature is too high, the glass is likely to be melted by the heat at the time of combustion of the resin component of the thermoplastic resin composition, whereby formation of the coating film of the glass tends to be difficult. Consequently, the flame retardancy or the effect for suppressing smoke generation tends to be poor. Taking into consideration the type of the thermoplastic resin and its nature at the time of combustion, the glass transition temperature of the phosphate type glass is preferably higher than 300° C. and lower than 400° C.

The composition of the phosphate type glass of the present invention is not particularly limited so long as it is capable of providing the effect for imparting flame retardancy or for suppressing smoke generation at the time of combustion, to the resin composition or a molded product obtainable therefrom and so long as it can be mass-produced constantly. The amount of the phosphorus component in the phosphate type glass is, as represented by mol % as calculated as $P_2O_5$, usually from 10 to 60%, preferably from 15 to 45%. As a preferred phosphate type glass, a phosphate type glass may be mentioned which contains $P_2O_5$ and further contains at least one of RO (wherein R is a bivalent metal), $R'_2O$ (wherein R' is an alkali metal), $Al_2O_3$, $B_2O_3$ and $SO_3$. The above bivalent metal is preferably at least one bivalent metal selected from the group consisting of Mg, Ca, Zn, Sn and Ba. Particularly preferably, at least part thereof is made of Zn. The above alkali metal is preferably at least one alkali metal selected from the group consisting of Li, Na and K. Specifically, the phosphate type glass may, for example, be a $P_2O_5$—ZnO—$R'_2O$ type glass, a $P_2O_5$—ZnO—$SO_3$ type glass or a $P_2O_5$—ZnO—$Al_2O_3$ type glass.

The phosphate type glass is preferably a phosphate type glass of a composition comprising, as represented by mol %, from 15 to 45% of $P_2O_5$, from 3 to 60% of RO (wherein at least part thereof is ZnO), from 3 to 40% of $R'_2O$, from 0 to 15% of $Al_2O_3$, from 3 to 25% of $B_2O_3$ and from 0 to 30% of $SO_3$, as components. Particularly preferably, the phosphate type glass is a phosphate type glass of a composition comprising, as represented by mol %, from 20 to 30% of $P_2O_5$, from 10 to 55% of ZnO, from 0 to 15% of RO other than ZnO, from 5 to 35% of $R'_2O$, from 1 to 5% of $Al_2O_3$, from 8 to 20% of $B_2O_3$ and from 3 to 20% of $SO_3$, as components. Further, within a range not to impair the effects in the present invention, the composition may contain, in addition to the above components, a metal oxide of e.g. Sr, Ti, Fe, Co, Ni, Cu, Zr or Mo, as other component.

In the present invention, the form of the phosphate type glass is not particularly limited, and various forms such as a pellet-form, a granular form, a powder form and a fiber-form, may be employed, but a powder form or a fiber form is preferred. In the case of a powder form, one having an average particle size of at most 10 µm is preferred, since the contact area with the resin will be large, and at the time of combustion, the glass will easily be melted and a coating film of the glass will be easily formed, whereby the effect for imparting flame retardancy will be obtained.

It is preferred that surface treatment is preliminarily applied to the phosphate glass of the present invention prior to mixing it to the thermoplastic resin. It is thereby possible to improve the adhesion of the phosphate type glass and the thermoplastic resin, when the phosphate type glass and the thermoplastic resin are kneaded to form a thermoplastic resin composition, or when such a thermoplastic resin composition is molded. If the adhesion of the phosphate type glass to the thermoplastic resin is inadequate, a void space will be formed at their interface, and such a void space hinders melting of the phosphate type glass at the time of combustion to form the coating film of the glass, and consequently, the effect for imparting the flame retardancy tends to be inadequate. It is important to prevent such a drawback. Further, in handling the phosphate type glass, it is thereby possible to improve the handling efficiency by suppressing generation of static electricity.

As the surface treating agent for the surface treatment, a coupling agent, a film former, a lubricant and an antistatic agent may, for example, be mentioned, and they may be used alone or in combination as a mixture of a plurality of them. The above component to be contained in the surface treating agent may suitably be selected depending upon the type of the thermoplastic resin to be mixed. The amount of the surface treating agent to be applied to the phosphate type glass is preferably from 0.1 to 5.0 mass % as solid content based on the mass of the phosphate type glass after application. If the applied amount is smaller than 0.1 mass %, no adequate improvement in the handling property for handling the glass or in the adhesion to the above resin tends to be obtained, or it tends to be difficult to protect the phosphate type glass. On the other hand, if the applied amount exceeds 5.0 mass %, such may deteriorate the dispersion of the phosphate type glass in the thermoplastic resin.

As the above coupling agent, a silane coupling agent, a borane coupling agent or a titanate coupling agent may, for example, be used. It is particularly preferred to use a silane coupling agent, whereby the adhesion of the thermoplastic resin and the phosphate type glass will be good. As such a silane coupling agent, an amino silane coupling agent, an epoxy silane coupling agent or an acryl silane coupling agent may, for example, be used. Among such silane coupling agents, it is particularly preferred to use an amino silane coupling agent, whereby the adhesion between the phosphate type glass and at least one thermoplastic resin selected from the group consisting of a polycarbonate resin, a polyphenylene ether resin, a polystyrene resin and an acrylonitrile/butadiene/styrene copolymer resin, will be excellent.

As the above-mentioned film former, a polymer such as a vinyl acetate resin, a urethane resin, an acrylic resin, a polyester resin, a polyether resin, a phenoxy resin, a polyamide resin, an epoxy resin or a polyolefin resin, or a modified product thereof may be used. As the above-mentioned lubricant, a surfactant of a fatty acid ester type, a fatty acid ether type, an aromatic ester type or an aromatic ether type may be used. As the above-mentioned antistatic agent, an inorganic salt such as lithium chloride or potassium iodide, or a quaternary ammonium salt of e.g. an ammonium chloride type or an ammonium ethosulfate type may be used.

Further, the thermoplastic resin composition of the present invention contains from 0.1 to 50 parts by mass of the above phosphate type glass per 100 parts by mass of the thermoplastic resin. If it is less than 0.1 part by mass, no adequate effect for imparting the flame retardancy will be obtained, and if it exceeds 50 parts by mass, the molding flowability of the resin composition is likely to be poor. Preferably, the amount of the phosphate type glass is from 0.5 to 30 parts by mass.

Description of the Phosphorus Type Flame Retardant

As the phosphorus type flame retardant other than the phosphate type glass of the present invention (hereinafter referred to simply as the phosphorus type flame retardant), a phosphoric acid ester type, a halogen-containing phosphoric acid ester type, a polyphosphate type or a red phosphorus type may, for example, be mentioned. The phosphorus type flame retardant is preferably a phosphorus flame retardant containing no halogen atom such as a chlorine atom or a bromine atom. The phosphoric acid ester type may, for example, be a monomer type phosphoric acid ester such as triphenyl phosphate (TPP), or a condensed type phosphoric acid ester such as a resorcinol bis(diphenyl phosphate) (RDP) or a bisphenol A-bis(diphenyl phosphate) (BADP). The polyphosphate type may, for example, be ammonium polyphosphate (APP) or melamine polyphosphate (MPP). The halogen-containing phosphoric acid ester type may, for example, be tris(chloroethyl) phosphate. From such a viewpoint that the effect for the flame retardancy is excellent, it is preferred to use at least one phosphorus type flame retardant selected from the group consisting of the monomer type phosphoric acid ester flame retardant and a condensed type phosphoric acid ester flame retardant. Further, such a phosphorus type flame retardant is preferably a phosphorus type flame retardant containing no halogen atom.

The phosphorus type flame retardant may be liquid or solid. Especially in a case where the phosphorus type flame retardant is powdery, it may be uniformly dispersed in the thermoplastic resin when it is mixed or kneaded with the thermoplastic resin, whereby the thermoplastic resin composition will be able to exhibit good flame retardancy. The amount of the phosphorus type flame retardant to be incorporated, is from 0.1 to 50 parts by mass per 100 parts by mass of the thermoplastic resin. If it is less than 0.1 part by mass, the effect for the flame retardancy tends to be poor, and if it exceeds 50 parts by mass, the mechanical strength of the resin composition tends to be low, or the heat resistance tends to be poor.

In the present invention, by the combination of the phosphate type glass and the phosphorus type flame retardant, the flame retardancy of the thermoplastic resin composition will be improved as compared with a case where they are respectively used alone. Further, rather than using the phosphorus type flame retardant alone, by the combination of the phosphate type glass and the phosphorus type flame retardant, it is possible to suppress the deterioration of the heat resistance of the resin composition. At least in the case of a thermoplastic resin containing a polycarbonate resin, particularly remarkable effects of combination can be obtained.

The total amount of the phosphate type glass and the phosphorus type flame retardant is preferably at most 50 parts by mass, per 100 parts by mass of the thermoplastic resin. If it exceeds 50 parts by mass, the heat resistance of the resin composition tends to be low, or the molding flowability tends to be poor. The total amount of the phosphate type glass and the phosphorus type flame retardant is preferably from 0.5 to 50 parts by mass, per 100 parts by mass of the thermoplastic resin composition. In the case of a thermoplastic resin having a relatively low combustion property such as a polycarbonate resin, adequate flame retardancy can be accomplished even when the amount is from 1 to 15 parts by mass. In the case of a thermoplastic resin having a relatively high combustion property, such as a polyphenylene ether resin, a polystyrene resin, or an acrylonitrile/butadiene/styrene copolymer resin, the amount is preferably from 10 to 45 parts by mass.

Further, with the thermoplastic resin composition of the present invention, deterioration of the flame retardancy can be suppressed even when melt kneading is repeatedly carried out, and the high flame retardancy can be maintained even with a molded product obtained by melting and molding by recycling a molded product of this thermoplastic resin composition. Accordingly, the thermoplastic resin composition of the present invention is excellent in the recycling property.

Description of the Antidripping Agent

The thermoplastic resin composition of the present invention preferably further contains a antidripping agent in addition to the phosphate type glass and the phosphorus type flame retardant. The antidripping agent is incorporated for the purpose of providing a function to suppress such a phenomenon that at the time of combustion, the softened and melted thermoplastic resin will flow and drip. As such a antidripping agent, a fluorine resin is mainly employed. The fluorine resin may, for example, be polymonofluoroethylene, polychlorotrifluoroethylene, polytetrafluoroethylene (hereinafter referred to as PTFE), polyvinylidene fluoride, a tetrafluoroethylene/hexafluoropropylene copolymer, a tetrafluoroethylene/perfluoro(alkyl vinyl ether) copolymer or an ethylene/tetrafluoroethylene copolymer. It is particularly preferred to employ PTFE, which provides an excellent antidripping property with a small amount. The amount of the antidripping agent to be incorporated, is preferably from 0.05 to 2 parts by mass, per 100 parts by mass of the thermoplastic resin. If it is less than 0.05 part by mass, no adequate antidripping effect can be obtained, and if it exceeds 2 parts by mass, the mechanical strength of the resin composition tends to be low, or the flowability tends to be low.

Description of Other Additives

The thermoplastic resin composition of the present invention may further contain a coupling agent, a film former, a lubricant, an antistatic agent, etc., apart from ones contained in the above-described surface treating agent of the phosphate type glass. Further, in addition thereto, various additives such as a stabilizer and a lubricating agent may be incorporated. As such additives, a coupling agent such as a silane coupling agent, a plasticizer such as a phthalic acid ester, a lubricating agent such as a stearic acid derivative, an antioxidant such as a hindered phenol type antioxidant, a light stabilizer such as a hindered amine type light stabilizer, a heat stabilizer such as an organic tin compound, an ultraviolet absorber such as a benzotriazole compound, a coloring agent such as a pigment, an antistatic agent such as a surfactant, a filler such as calcium carbonate, a reinforcing agent such as a glass fiber, etc., may, for example, be optionally employed. Further, in order to further improve the flame retardancy, a flame retardant other than the phosphorus type flame retardant may be incorporated. As such a flame retardant, a metal hydroxide flame retardant such as magnesium hydroxide or aluminum hydroxide, a metal oxide flame retardant such as antimony trioxide, molybdenum oxide, tin oxide (SnO) or zinc oxide (ZnO), a bromine type flame retardant such as decabromodiphenyl ether or tribromophenyl allyl ether, or a chlorine type flame retardant such as chlorinated paraffin may, for example, be mentioned. As such a flame retardant, a metal hydroxide flame retardant or a metal oxide flame retardant is preferred, and it is advisable that a bromine-type flame retardant or a chlorine-type flame retardant should not substantially be used. Further, such additives are preferably preliminarily incorporated in the resin component.

The thermoplastic resin composition of the present invention is preferably a thermoplastic resin composition which does not substantially contain a component containing chlorine atoms or bromine atoms. The component containing chlorine atoms or bromine atoms is a compound containing chlorine atoms or bromine atoms, among the above phosphate type glass, the above phosphorus type flame retardant, the above surface treating agent, the above antidripping agent and the above-mentioned other additives, in addition to the above thermoplastic resin. It is preferred that the thermoplastic resin composition of the present invention does not contain a component containing chlorine atoms or bromine atoms in an amount more than necessary to obtain the flame retardant effect due to the presence of such chlorine atoms or bromine atoms.

Description of the Composition

The thermoplastic resin composition of the present invention can be produced by mixing the thermoplastic resin, the phosphate type glass, the phosphorus type flame retardant and the optional antidripping agent, and further, other additives, which may be incorporated as the case requires. It is particularly preferred to produce the composition as a molding material by the same process as the conventional process for producing a thermoplastic resin composition, such as mixing and simultaneous melting, such as melt kneading or melting after mixing. It is particularly preferred to produce a pelletized molding material made of the thermoplastic resin composition, by melt mixing the respective starting material components, followed by extrusion molding into pellets.

The thermoplastic resin composition of the present invention being a molding material, may be formed into a molded product by molding it by various methods in the same manner as for the conventional thermoplastic resin compositions. The molding method may, for example, be press molding, extrusion molding, calendar molding, injection molding or pultrusion. By such a molding method, a molded product of the thermoplastic resin composition of the present invention can be obtained.

As the molded product, a roof related material such as a roof, an eaves or a rain gutter, an exterior outer wall material such as a siding material, a deck material or a fence material, an opening-related material such as a window frame, a door or a gate, an interior-related material such as a wall material, a floor material, a ceiling material, a crown, a casing, a base-board, stairs, handrails or heat insulating materials, other building materials or ornamental materials, furniture materials, disaster-prevention trough and signboards may, for example, be mentioned. Further, electronic uses such as electric wire coating materials, housing materials for electric products, sealing materials for semiconductors or printed circuit boards, and vehicle uses including interior materials such as cushions for seats, door panels, front panels and rear panels, may, for example, be mentioned.

Now, the present invention will be described in further detail with reference to specific Examples. However, it should be understood that the present invention is by no means restricted to such specific Examples.

Firstly, various evaluation methods will be described.

For the measurement of the glass transition temperature and the softening temperature, a powder having an average particle size of 7 μm obtained by pulverizing glass cullet by means of a disk mill, was subjected to the measurement, and by means of a differential thermal analyzer (DTA), the measurement was carried out at a heating rate of 10° C./min in a nitrogen atmosphere. In the DTA curve, the temperature at the shoulder of the first heat absorption portion was read out as the glass transition temperature, and the temperature at the lowest point in the second heat absorption portion was read out as a Littleton point (the softening temperature).

With respect to the test for the flame retardancy, a vertical burning test was carried out five times with respect to test specimens of the same composition in accordance with UL94 standards by using test specimens having a width of 12.7 mm, a length of 127 mm and a thickness of 1.6 mm. The afterflame periods of the five times were totaled to obtain the total afterflame time (seconds), and a case where the total afterflame time exceeds 250 seconds, was identified as "not measurable". In accordance with the evaluation standards of the above identified standards, evaluation was made by four rankings of V-0, V-1, V-2 and out of standards (does not corresponds to V-0, V-1 or V-2).

The test on the deflection temperature under load (hereinafter referred to as DTUL) as an index of the heat resistance, was carried out in accordance with ASTM-D648, and a test specimen having a thickness of 3.2 mm, a width of 12.7 mm and a length of 127 mm, was subjected to the measurement.

The test on the smoke generation-suppressing property was carried out by means of an NBS smoke chamber test apparatus in accordance with the test method of ASTM-E662, and a test specimen having a width of 76.2 mm, a length of 76.2 mm and a thickness of 3 mm, was subjected to the measurement. In the test, the test specimen was heated with an average radiation energy of 25 KW/m$^2$ under non-flaming conditions, whereby an attenuation of a transmitted light by the smoke generated in the test box was measured. The amount of smoke generation was obtained as the maximum specific optical density (Dmax), whereby the smoke generation-suppressing property was evaluated.

The tests on the tensile strength and the flexural strength were carried out in accordance with ASTM-D638 and ASTM-E790, respectively.

Phosphate Type Glass

Glass materials were mixed, melted and then solidified to prepare a glass cullet, so that the glass composition would be, as represented by mol percentage, 4.1% of $Li_2O$, 5.7% of $Na_2O$, 4.4% of $K_2O$, 24.9% of $P_2O_5$, 9.3% of $SO_3$, 40.5% of ZnO, 1.5% of $Al_2O_3$ and 9.6% of $B_2O_3$. The cullet was pulverized and sieved to obtain a powdery phosphate type glass (PG) having an average particle size of 3.6 μm. The glass transition temperature and the softening temperature of the glass were measured, whereby the glass transition temperature was 354° C., and the softening temperature was 490° C.

To the phosphate type glass (PG), a monoaminosilane coupling agent was deposited in an amount of 2.0 mass % as solid content based on the mass of the above glass after the application, to obtain a surface-treated phosphate type glass (PG1).

EXAMPLE 1

100 parts by mass of a polycarbonate resin (PC: LEXAN 121R, manufactured by GE Plastics Japan Ltd.), 1 part by mass of the surface-treated phosphate type glass (PG1), 1 part by weight of bisphenol A-bis(diphenyl phosphate) (BADP, manufactured by Daihachi Chemical Industry Co., Ltd.) as a phosphorus type flame retardant and 0.5 part by mass of PTFE (average particle size: 475 μm, manufactured by Asahi Glass Company, Limited) as a antidripping agent, were preliminarily mixed and then melt-kneaded by means of a twin screw extruder having the temperature of the cylinder set at 260° C., to obtain a pelletized thermoplastic resin composition (once-kneaded product).

The above resin composition (once-kneaded product) was again melt-kneaded under the same conditions to obtain a pelletized thermoplastic resin composition (twice-kneaded product). Further, the resin composition (twice-kneaded product) was again melt-kneaded under the same conditions to obtain a pelletized thermoplastic resin composition (three times-kneaded product). These three types of thermoplastic resin compositions were respectively, dried at 120° C. for 5 hours and molded by means of an injection molding machine at a cylinder temperature of 290° C. and a mold temperature of 105° C. to obtain three types of test specimens as Example 1.

EXAMPLE 2 AND COMPARATIVE EXAMPLES 1 AND 2

Test specimens of molded products of thermoplastic resin compositions as Example 2 and Comparative Examples 1 and 2 were obtained in the same manner as in Example 1 except that the blend ratio was changed as shown in Table 1.

TABLE 1

| | Blend ratio (parts by mass) | | | |
|---|---|---|---|---|
| | Ex. 1 | Ex. 2 | Comp. Ex. 1 | Comp. Ex. 2 |
| PC | 100 | 100 | 100 | 100 |
| PG1 | 1 | 3 | — | — |
| BADP | 1 | 3 | 3 | 5 |
| PTFE | 0.5 | 0.5 | 0.5 | 0.5 |

These twelve types of test specimens were subjected to the test for DTUL and the test for the flame retardancy, and the evaluation results are shown in Tables 2 and 3.

TABLE 2

| | Number of kneading times (times) | | | | | |
|---|---|---|---|---|---|---|
| | Ex. 1 | | | Ex. 2 | | |
| UL94 test | 1 | 2 | 3 | 1 | 2 | 3 |
| Total afterflame time (seconds) | 21 | 18 | 19 | 17 | 11 | 11 |
| Evaluation | V-0 | V-0 | V-0 | V-0 | V-0 | V-0 |
| DTUL (° C.) | 122 | 122 | 121 | 117 | 118 | 117 |

TABLE 3

| | Number of kneading times (times) | | | | | |
|---|---|---|---|---|---|---|
| | Comp. Ex. 1 | | | Comp. Ex. 2 | | |
| UL94 test | 1 | 2 | 3 | 1 | 2 | 3 |
| Total afterflame time (seconds) | 20 | 40 | 56 | 19 | 26 | 57 |
| Evaluation | V-0 | V-1 | V-1 | V-0 | V-0 | V-1 |
| DTUL (° C.) | 118 | 116 | 117 | 111 | 110 | 111 |

In Examples 1 and 2 wherein the phosphate type glass and the phosphorus flame retardant were used in combination, the total afterflame time did not substantially change even if the melt kneading was repeated, whereby it is evident that the flame retardancy did not deteriorate, and the recycling property was excellent. In Comparative Examples 1 and 2 wherein only the phosphorus type flame retardant was incorporated, the total afterflame time became long when the melt kneading was repeated, whereby it is evident that the flame retardancy decreased. Further, it is evident that DTUL was low.

EXAMPLE 3

100 parts by mass of a modified polyphenylene ether resin (modified PPE: NORYL115, manufactured by GE Plastics Japan Ltd.), 5 parts by mass of the surface-treated phosphate type glass (PG1), 5 parts by mass of triphenyl phosphate (TPP, manufactured by Daihachi Chemical Industry Co., Ltd.) and 10 parts by mass of bisphenol A-bis(diphenyl phosphate) (BADP, manufactured by Daihachi Chemical Industry Co., Ltd.), as phosphorus type flame retardants, and 0.2 part by mass of PTFE (average particle size: 475 μm, manufactured by Asahi Glass Company, Limited) as a antidripping agent, were preliminarily mixed and then melt-kneaded by means of a twin screw extruder having the temperature of the cylinder set at 270° C., to obtain a pelletized thermoplastic resin composition as Example 3. This thermoplastic resin composition was dried at 110° C. for 5 hours, and then molded by means of an injection molding machine at a cylinder temperature of 270° C. and a mold temperature of 60° C. to obtain test specimens to be subjected to tests.

COMPARATIVE EXAMPLES 3 AND 4

Pelletized thermoplastic resin compositions as Comparative Examples 3 and 4 were obtained in the same manner as in Example 3 except that the blend ratio was changed as shown in Table 4. Further, these thermoplastic resin compositions were molded by the same method as in Example 3, to obtain test specimens.

These test specimens were subjected to the test for the flame retardancy, the test for DTUL and the test for the smoke generation-suppressing property, and the evaluation results are shown in Table 4.

TABLE 4

| | Ex. 3 | Comp. Ex. 3 | Comp. Ex. 4 |
|---|---|---|---|
| Blend ratio (parts by mass) | | | |
| Modified PPE | 100 | 100 | 100 |
| PG1 | 5 | — | — |
| TPP | 5 | — | 10 |
| BADP | 10 | — | 20 |
| PTFE | 0.2 | — | 0.2 |
| UL94 test | | | |
| Total afterflame time (seconds) | 151 | Not measurable | 136 |
| Evaluation | V-1 | Out of standards | V-1 |
| DTUL (° C.) | 74 | 103 | 63 |
| Smoke generation (Dmax) | 208 | 250 | 400 |

In Example 3 wherein the phosphate type glass and the phosphorus type flame retardant are used in combination, the flame retarding effect at a level of V-1 according to UL94 standards, can be obtained. Further, the amount of smoke generation in Example 3 is less than the amount of smoke generation in Comparative Example 3 wherein the flame retardant is not blended, and the satisfactory effect of flame retardancy is obtained. In Comparative Example 4 wherein only the phosphorus type flame retardant is incorporated, although the flame retarding effect at a level of V-1 according to UL94 standards is obtained, the amount of smoke generation is more than the amount of smoke generation in Example 3 wherein the phosphate type glass and the phosphorus type flame retardant are used in combination, and the satisfactory effect of flame retardancy is not obtained.

Further, the flame retardancy in Example 3 wherein the phosphate type glass and the phosphorus type flame retardant are used in combination, is equal to the flame retardancy in Comparative Example 4 wherein only the phosphorus type flame retardant is incorporated, at a level of V-1 according to UL94 standards. However, although DTUL of the resin composition is largely decreased by incorporating the phosphorus-type flame retardant, the effect of suppressing the decrease of DTUL can be obtained by using the combination of the phosphate type glass and the phosphorus type flame retardant.

EXAMPLE 4

100 parts by mass of a polymer alloy of a polyphenylene ether resin and a polypropylene resin (PPE/PP: XYLON T0700, manufactured by Asahikasei K.K.), 10 parts by mass of the surface-treated phosphate type glass (PG1), 10 parts by mass of bisphenol A-bis(diphenyl phosphate) (BADP, manufactured by Daihachi Chemical Industry Co., Ltd.), as a phosphorus type flame retardant, and 0.2 part by mass of PTFE (average particle size: 475 μm, manufactured by Asahi Glass Company, Limited) as a antidripping agent, were preliminarily mixed and then melt-kneaded by means of a twin screw extruder having the temperature of the cylinder set at 260° C., to obtain a pelletized thermoplastic resin composition as Example 4. This thermoplastic resin composition was dried at 100° C. for 3 hours and then molded by means of an injection molding machine at a cylinder temperature of 270° C. and a mold temperature of 60° C. to obtain test specimens to be subjected to various tests.

COMPARATIVE EXAMPLES 5 TO 7

Pelletized thermoplastic resin compositions as Comparative Examples 5 to 7 were obtained in the same manner as in Example 4 except that the blend ratio was changed as shown in Table 5. Further, these thermoplastic resin compositions were molded by the same method as in Example 4, to obtain test specimens.

These test specimens were subjected to the test for the flame retardancy, the test for DTUL, the test for the smoke generation-suppressing property, the test for tensile strength and the test for flexural strength, and the evaluation results are shown in Table 5 together with the blend compositions.

TABLE 5

|  | Ex. 4 | Comp. Ex. 5 | Comp. Ex. 6 | Comp. Ex. 7 |
|---|---|---|---|---|
| Blend ratio (parts by mass) |  |  |  |  |
| PPE/PP | 100 | 100 | 100 | 100 |
| PG1 | 10 | — | — | — |
| BADP | 10 | — | 20 | — |
| RDP | — | — | — | 20 |
| PTFE | 0.2 | — | 0.2 | 0.2 |
| UL94 test |  |  |  |  |
| Total afterflame time (seconds) | 192 | Not measurable | Not measurable | Not measurable |
| Evaluation | V-1 | Out of standards | Out of standards | Out of standards |
| DTUL (° C.) | 106 | 111 | 93 | 97 |
| Smoke generation (Dmax) | 176 | 213 | 262 | 277 |
| Tensile strength (MPa) | 50 | 42 | 54 | 54 |
| Flexural strength (MPa) | 80 | 63 | 84 | 86 |

In Example 4 wherein the phosphate type glass and the phosphorus type flame retardant are used in combination, the flame retarding effect at a level of V-1 according to UL94 standards, can be obtained. Further, the amount of smoke generation in Example 4 is less than the amount of smoke generation in Comparative Example 5 wherein the flame retardant is not blended, and the satisfactory effect of flame retardancy is obtained. In Comparative Examples 6 and 7 wherein only the phosphorus type flame retardant is incorporated, the flame retarding effect according to UL94 standards is not obtained, the amount of smoke generation is more than the amount of smoke generation in Example 4 wherein the phosphate type glass and the phosphorus type flame retardant are used in combination, and the effect of flame retardancy is not obtained.

Further, in Example 4 wherein the phosphate type glass and the phosphorus type flame retardant are used in combination, as compared to Comparative Examples 6 and 7 wherein only the phosphorus type flame retardant is incorporated, it is evident that approximately equal performances of the tensile strength and the flexural strength can be obtained, and the decrease of DTUL is suppressed.

INDUSTRIAL APPLICABILITY

The thermoplastic resin composition of the present invention is useful as a molding material to obtain a molded product excellent in flame retardancy and is useful as a molding material to obtain a molded product whereby the flame retardancy will not deteriorate even when melt kneading is repeated, and the recycling property is improved. The thermoplastic resin composition of the present invention as a molded product can be used for roof-related materials, exterior outer wall materials, opening-related materials, interior-related materials and other building materials, and further useful as various thermoplastic resin molded products for e.g. electronic uses or vehicle uses.

The entire disclosure of Japanese Patent Application No. 2003-026053 filed on Feb. 3, 2003 and Japanese Patent Application No. 2003-386156 filed on Nov. 17, 2003 including specification, claims and summary is incorporated herein by reference in its entirety.

What is claimed is:

1. A thermoplastic resin composition comprising a thermoplastic resin containing no halogen atom, from 0.1 to 50 parts by mass, per 100 parts by mass of said thermoplastic resin, of a surface-treated phosphate glass, and from 0.1 to 50 parts by mass, per 100 parts by mass of said thermoplastic resin, of a phosphorus flame retardant other than the above phosphate glass,
   wherein the surface-treated phosphate glass is surface treated with a surface treatment agent other than the thermoplastic resin or phosphorus flame retardant.

2. The thermoplastic resin composition according to claim 1, wherein the total amount of the surface-treated phosphate glass and the phosphorus flame retardant is from 0.5 to 50 parts by mass per 100 parts by mass of the thermoplastic resin containing no halogen atom.

3. The thermoplastic resin composition according to claim 1, wherein the thermoplastic resin containing no halogen atom is at least one thermoplastic resin selected from the group consisting of a polycarbonate resin, a polyphenylene ether resin, a polystyrene resin and an acrylonitrile/butadiene/styrene copolymer resin.

4. The thermoplastic resin composition according to claim 1, wherein the thermoplastic resin containing no halogen atom is a polycarbonate resin, and the total amount of the surface-treated phosphate glass and the phosphorus flame retardant is from 1 to 15 parts by mass per 100 parts by mass of the thermoplastic resin.

5. The thermoplastic resin composition according to claim 1, wherein the thermoplastic resin containing no halogen atom is at least one thermoplastic resin selected from the group consisting of a polyphenylene ether resin, a polystyrene resin and an acrylonitrile/butadiene/styrene copolymer resin, and the total amount of the phosphate glass and the phosphorus flame retardant is from 10 to 45 parts by mass per 100 parts by mass of the thermoplastic resin.

6. The thermoplastic resin composition according to claim 1, which further contains a antidripping agent in an amount of from 0.05 to 2 parts by mass per 100 parts by mass of the thermoplastic resin containing no halogen atom.

7. The thermoplastic resin composition according to claim 6, wherein the antidripping agent is polytetrafluoroethylene.

8. The thermoplastic resin composition according to claim 1, wherein the phosphorus flame retardant other than the surface-treated phosphate glass is at least one member selected from the group consisting of a monomer phosphoric acid ester flame retardant and a condensed phosphoric acid ester flame retardant.

9. The thermoplastic resin composition according to claim 8, wherein the phosphorus flame retardant is selected from the group consisting of a monomer phosphoric acid ester flame retardant and a condensed phosphoric acid ester flame retardant, is a phosphorus flame retardant containing no halogen atom.

10. The thermoplastic resin composition according to claim 1, wherein the surface-treated phosphate glass has a glass transition temperature higher than 300° C. and lower than 400° C.

11. The thermoplastic resin composition according to claim 10, wherein the surface-treated phosphate glass comprises a phosphate glass of a composition comprising, as represented by mol %, from 15 to 45% of $P_2O_5$, from 3 to 60% of RO at least part thereof is ZnO, from 3 to 40% of $R'_2O$, from 0 to 15% of $Al_2O_3$, from 3 to 25% of $B_2O_3$ and from 0 to 30% of $SO_3$ as components wherein R is a bivalent metal, and R' is an alkali metal.

12. The thermoplastic resin composition according to claim 1, wherein the thermoplastic composition contains substantially no component containing a chlorine atom or a bromine atom.

13. The thermoplastic resin composition according to claim 6, wherein the thermoplastic composition contains substantially no component containing a chlorine atom or a bromine atom.

14. A process for producing the thermoplastic resin composition as defined in claim 1, which comprises melting and mixing the respective components, followed by extrusion molding into pellets to obtain a pelletized molding material made of the thermoplastic resin composition.

15. A process for producing the thermoplastic resin composition as defined in claim 6, which comprises melting and mixing the respective components, followed by extrusion molding into pellets to obtain a pelletized molding material made of the thermoplastic resin composition.

16. The thermoplastic resin composition according to claim 1, wherein the surface-treated phosphate glass is surface treated with at least one coupling agent selected from the group consisting of a silane coupling agent, a borane coupling agent and a titanate coupling agent.

17. The thermoplastic resin composition according to claim 1, wherein the surface-treated phosphate glass is surface treated with a silane coupling agent.

18. The thermoplastic resin composition according to claim 1, wherein the surface-treated phosphate glass is surface treated with a amino silane coupling agent in an amount of from 0.1 to 5.0 mass percent.

19. A thermoplastic resin composition comprising a thermoplastic resin containing no halogen atom, from 0.1 to 50 parts by mass, per 100 parts by mass of said thermoplastic resin, of a phosphate glass, and from 0.1 to 50 parts by mass, per 100 parts by mass of said thermoplastic resin, of a phosphorus flame retardant other than the above phosphate glass,
wherein the phosphate glass comprises from 20 to 30 mol % $P_2O_5$, from 10 to 55 mol % ZnO, from 0 to 15 mol % of RO other than ZnO, from 5 to 35 mol % of $R'_2O$, from 1 to 5 mol % of $Al_2O_2$, from 8 to 20 mol % of $B_2O_3$ and from 3 to 20 mol % $SO_3$, wherein R is a divalent metal and R' is an alkali metal.

20. The thermoplastic resin composition according to claim 19, wherein the total amount of the phosphate glass and the phosphorus flame retardant is from 0.5 to 50 parts by mass per 100 parts by mass of the thermoplastic resin containing no halogen atom.

21. The thermoplastic resin composition according to claim 19, wherein the thermoplastic resin containing no halogen atom is at least one thermoplastic resin selected from the group consisting of a polycarbonate resin, a polyphenylene ether resin, a polystyrene resin and an acrylonitrile/butadiene/styrene copolymer resin.

22. The thermoplastic resin composition according to claim 19, wherein the thermoplastic resin containing no halogen atom is a polycarbonate resin, and the total amount of the phosphate glass and the phosphorus flame retardant is from 1 to 15 parts by mass per 100 parts by mass of the thermoplastic resin.

23. The thermoplastic resin composition according to claim 19, wherein the thermoplastic resin containing no halogen atom is at least one thermoplastic resin selected from the group consisting of a polyphenylene ether resin, a polystyrene resin and an acrylonitrile/butadiene/styrene copolymer resin, and the total amount of the phosphate glass and the phosphorus flame retardant is from 10 to 45 parts by mass per 100 parts by mass of the thermoplastic resin.

24. The thermoplastic resin composition according to claim 19, which further contains an antidripping agent in an amount of from 0.05 to 2 parts by mass per 100 parts by mass of the thermoplastic resin containing no halogen atom.

25. The thermoplastic resin composition according to claim 24, wherein the antidripping agent is polytetrafluoroethylene.

26. The thermoplastic resin composition according to claim 19, wherein the phosphorus flame retardant other than the phosphate glass is at least one member selected from the group consisting of a monomer phosphoric acid ester flame retardant and a condensed phosphoric acid ester flame retardant.

27. The thermoplastic resin composition according to claim 26, wherein the phosphorus flame retardant is selected from the group consisting of a monomer phosphoric acid ester flame retardant and a condensed phosphoric acid ester flame retardant, and is a phosphorus flame retardant containing no halogen atom.

28. The thermoplastic resin composition according to claim 19, wherein the phosphate glass has a glass transition temperature higher than 300° C. and lower than 400° C.

29. The thermoplastic resin composition according to claim 19, wherein the phosphate glass is a phosphate glass having a surface treatment preliminarily applied.

30. The thermoplastic resin composition according to claim 29, wherein the surface treatment is surface treatment with a silane coupling agent.

31. The thermoplastic resin composition according to claim 29, wherein the phosphate glass has a glass transition temperature higher than 300° C. and lower than 400° C.

32. The thermoplastic resin composition according to claim 19, wherein the thermoplastic composition contains substantially no component containing a chlorine atom or a bromine atom.

33. The thermoplastic resin composition according to claim 24, wherein the thermoplastic composition contains substantially no component containing a chlorine atom or a bromine atom.

34. A process for producing the thermoplastic resin composition as defined in claim 19, which comprises melting and mixing the respective components, followed by extrusion molding into pellets to obtain a pelletized molding material made of the thermoplastic resin composition.

35. A process for producing the thermoplastic resin composition as defined in claim 24, which comprises melting and mixing the respective components, followed by extrusion molding into pellets to obtain a pelletized molding material made of the thermoplastic resin composition.

36. The thermoplastic resin composition of claim 19, wherein the phosphate glass is in the form of at least one selected from the group consisting of a pellet form, a granular form, a powder form and a fiber form.

37. The thermoplastic resin composition according to claim 19, wherein the phosphate glass is in the form of a powder having an average particle size of at most 10 µm.

* * * * *